United States Patent [19]

Taguchi

[11] Patent Number: 5,528,115
[45] Date of Patent: Jun. 18, 1996

[54] INDUCTIVE LOAD DRIVE CIRCUIT FOR ELIMINATING BACK ELECTROMOTIVE FORCE CAUSED BY A LOAD

[75] Inventor: Fumiya Taguchi, Yokohama, Japan

[73] Assignee: Nikon Corporation, Tokyo, Japan

[21] Appl. No.: 205,067

[22] Filed: Mar. 3, 1994

[30] Foreign Application Priority Data

Mar. 10, 1993 [JP] Japan ................. 5-016249 U

[51] Int. Cl.$^6$ ................................ H02P 3/12
[52] U.S. Cl. ................ 318/379; 318/261; 318/368; 388/928.1
[58] Field of Search .................. 318/256, 261, 318/273, 293, 375, 379, 380, 368, 377, 500, 515; 388/903, 907.5, 928.1

[56] References Cited

U.S. PATENT DOCUMENTS

| | | | |
|---|---|---|---|
| 2,965,827 | 12/1960 | Hohne, Jr. . | |
| 3,379,949 | 4/1968 | Todd . | |
| 3,732,475 | 5/1973 | Geerling | 318/275 |
| 3,919,611 | 11/1975 | Takahashi et al. | 318/380 |
| 5,059,992 | 10/1991 | Akiike . | |
| 5,138,242 | 8/1992 | Kim et al. | 318/501 |

*Primary Examiner*—Bentsu Ro

[57] ABSTRACT

An inductive load drive circuit for driving an inductive load, such as a motor, and for preventing charging of a power source by the back electromotive force of an inductive load. The inductive load drive circuit uses a battery as the power source for supplying power to the load. A first switching mechanism can serially connect and disconnect the inductive load and the battery. The first switching mechanism is controlled so that it disconnects the inductive load from the battery when the inductive load is in a condition in which the inductive load is able to generate back electromotive force or when the inductive load will be shifted to such a condition. Moreover, a bypass circuit can be used to consume the energy of the back electromotive force of the inductive load. A second switching mechanism is serially connected to the bypass circuit, with the serial combination of the second switching mechanism and the bypass circuit being in parallel with the power source. The first switching mechanism and the second switching mechanism are controlled so that they are in opposite switching conditions.

21 Claims, 3 Drawing Sheets

INDUCTIVE LOAD DRIVE CIRCUIT FOR ELIMINATING BACK ELECTROMOTIVE FORCE CAUSED BY A LOAD

BACKGROUND OF THE INVENTION

1. Field of the Invention

The present invention relates to an inductive load drive circuit and, more particularly, to an inductive load drive circuit which prevents back electromotive force from flowing into the load power source.

2. Description of the Related Art

Electric motors, which operate on battery power, are used in cameras to wind camera film, drive the camera lens and act as other types of actuators. An electric motor used in a camera is typically driven by a bridge circuit type driver IC comprising various transistors. The motor achieves the operation modes of normal rotation (flow in a normal direction), reverse rotation (flow in a reverse direction), braking (grounding and shorting both terminals of the motor) and stopping (both terminals of the motor are open) by various ON and OFF combinations of the bridge circuit transistors.

In order to prevent breakdowns in the bridge circuit transistors and other components due to surge current when both terminals of the motor are open, surge killer diodes are connected in parallel in a direction opposite to the normal electric current direction of each transistor in the bridge circuit.

When each transistor of the bridge circuit is cut off (when the bridge circuit is open in both directions with respect to the motor) and the motor is rotating by inertia, back electromotive force of the motor is generated. The back electromotive force produces an electric current which flows through the surge killer diodes into the battery power source through a battery terminal. In effect, a charging condition is produced through the surge killer diodes of the bridge circuit.

This charging condition is undesirable for a power source battery that cannot be charged. The charging condition can cause the battery to heat up or develop fluid leaks.

SUMMARY OF THE INVENTION

Accordingly, it is an object of the present invention to provide a drive circuit which reliably prevents battery charging operations resulting from back electromotive force generated by inductive loads.

It is an additional object of the present invention to maintain stable operation of devices, such as cameras, which use batteries to power an inductive load.

Additional objects and advantages of the invention will be set forth in part in the description which follows, and, in part, will be obvious from the description, or may be learned by practice of the invention.

The foregoing objects of the present invention are achieved by providing an inductive load drive circuit for driving an inductive load, including a first switching mechanism, having a first state and a second state, which serially connects the inductive load with a power source when in the first state, and disconnects the inductive load from the power source when in the second state, a control mechanism for controlling the first switching mechanism so that the first switching mechanism is in the first state when the inductive load is unable to generate electromotive force and the first switching mechanism is in the second state when the inductive load is able to generate back electromotive force or when the inductive load is to be shifted to a condition in which the inductive load is able to generate back electromotive force.

The inductive load drive circuit can further include a bypass circuit for consuming energy of a back electromotive force generated by the inductive load, a second switching mechanism, having a first state and a second state, which serially connects the bypass circuit and the inductive load when in the first state, and disconnects the bypass circuit from the inductive load when in the second state, wherein the first switching mechanism, the second switching mechanism and the bypass circuit are configured so that, if the first switching mechanism and the second switching mechanism were both in the first state, the bypass circuit and the second switching mechanism, connected in series, would be connected in parallel with the power source, and the first switching mechanism and the second switching mechanism are controlled so that they are in different states.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
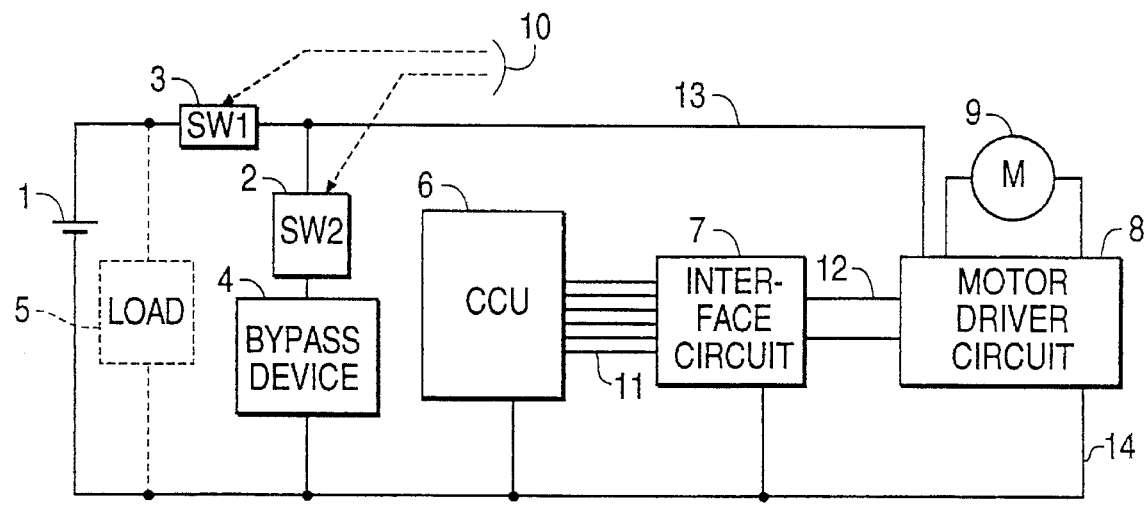
FIG. 1 a block diagram which shows an overall configuration of an inductive load drive circuit of an embodiment of the present invention.

Reference will now be made in detail to the present preferred embodiments of the present invention, examples of which are illustrated in the accompanying drawings, wherein like reference numerals refer to like elements throughout.

FIG. 1 is a block diagram which shows an overall configuration of an inductive load drive circuit of an embodiment of the present invention. The inductive load drive circuit includes a battery 1 for supplying power, a first switching mechanism (SW1) 3, a second switching mechanism (SW2) 2, a bypass device 4 for discharging energy related to back electromotive force, a central control unit (CCU) 6, an interface circuit 7, and a motor driver circuit 8 which contains bridge circuit 30 (see FIG. 2). CCU 6 is preferably a microprocessor. Motor 9 is an inductive load. Battery 1 also supplies power to load 5, which represents loads other than motor 9.

Both terminals of battery 1 are connected to load 5. One terminal is connected to motor driver circuit 8 through first switching mechanism 3 and power line 13, and the other terminal is connected to motor driver circuit 8 through ground line 14. Second switching mechanism 2 and bypass circuit 4 are connected in series between power line 13 and ground line 14. CCU 6 is connected to interface circuit 7 via latch code transmission lines 11. Interface circuit 7 is connected to motor driver circuit 8 through motor driver control signal lines 12. Motor 9 is connected to the output terminal of motor driver circuit 8. First and second switching mechanisms 2 and 3 are controlled by a control signal on switching mechanism control line 10.

Figure 2:
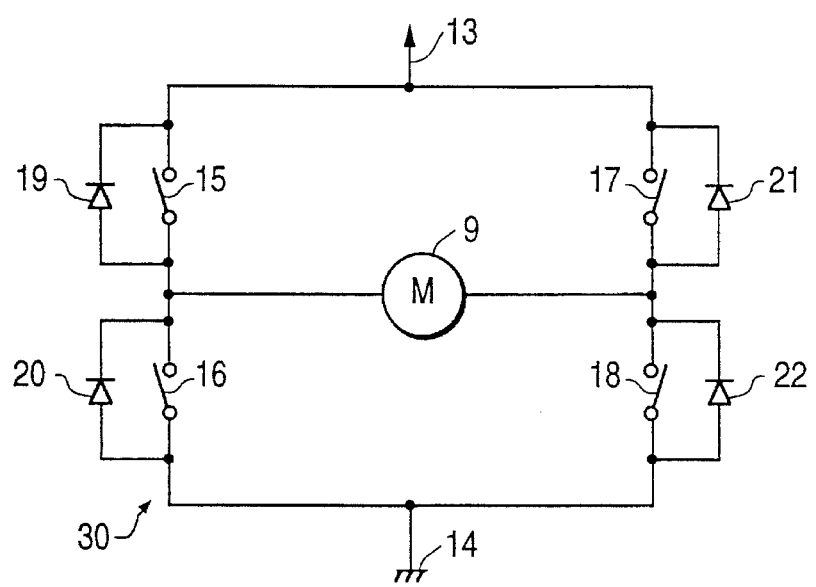
FIG. 2 is an electrical circuit diagram which shows the configuration of the bridge circuit positioned inside the motor driver circuit of FIG. 1.

The motor driver circuit 8 contains a bridge circuit, such as bridge circuit 30 illustrated in FIG. 2. Bridge circuit 30 has, for example, four switches 15, 16, 17 and 18, constituted by respective transistors. Switches 15 and 16 are serially connected between power line 13 and ground line 14, and switches 17 and 18 are serially connected between power line 13 and ground line 14. Motor 9 is connected between the junction of switches 15 and 16 and the junction of switches 17 and 18. Diodes 19, 20, 21 and 22 are connected in parallel to switches 15, 16, 17 and 18, respectively. Diodes 19, 20, 21 and 22 are connected in a reverse bias direction through the voltage (positive voltage in the present embodiment) applied to power line 13.

In the bridge circuit shown in FIG. 2, motor 9 rotates normally when switches 15 and 18 are ON and rotates in reverse when switches 16 and 17 are ON. A brake mode results when switches 16 and 18 are ON. A stop mode results when switches 15 through 18 are all open, or OFF. Inertial rotation can occur while in the stop mode.

Figure 3:
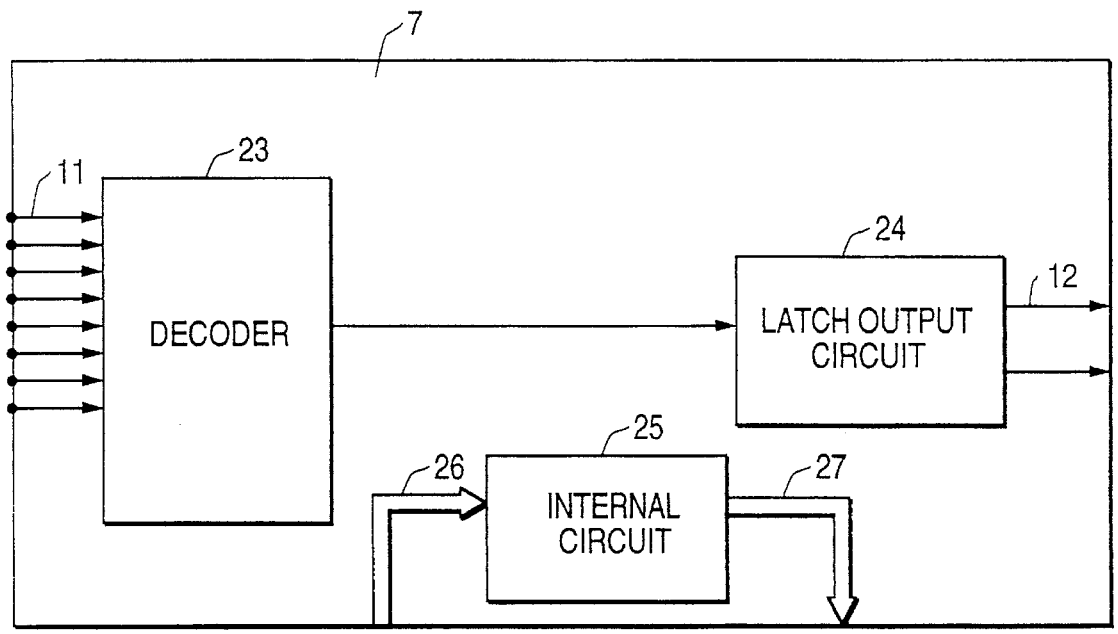
FIG. 3 is a block diagram which shows a detailed configuration of the interface circuit in the embodiment of FIG. 1.

Interface circuit 7 of the embodiment of FIG. 1 is further illustrated in FIG. 3. Interface circuit 7 includes decoder 23, latch output circuit 24 and internal circuit 25. Decoder 23 decodes a latch code input from CCU 6 through transmission line 11 and inputs the decoded data to latch output circuit 24. Latch output circuit 24 controls the bridge circuit by, for example, supplying a two-bit signal 12 to motor driver circuit 8 based on the decoded data. Interface circuits, such as interface circuit 7, are well-known.

In FIG. 1, the power for controlling CCU 6, interface circuit 7, and motor driver circuit 8 is preferably supplied through a separate power system (not illustrated) and not directly from battery 1.

Motor 9 generates back electromotive force when it is rotating by inertia in stop mode. This can cause a condition to occur in which electric current is applied to the positive electrode of battery 1 through the electric current caused by back electromotive force passing through power line 13 through surge killer diodes 19–22. This electric current caused by back electromotive force creates a charging operation for battery 1. This charging operation may not be desirable, depending on the characteristics of the battery. Therefore, the above embodiment according to the present invention prevents this type of charging operation.

In summary, motor 9 has four modes: normal rotation mode (flow in a normal direction), reverse rotation mode (flow in a reverse direction), brake mode, and stop mode. While in stop mode, motor 9 can be rotating by inertial (inertial rotation) or motor 9 can be "not rotating." Motor 9 is capable of generating back electromotive force when in ₀.op mode. However, back electromotive force is only generated when in stop mode and there is inertial rotation. Back electromotive force is not generated when in stop mode without rotation.

Figure 4:
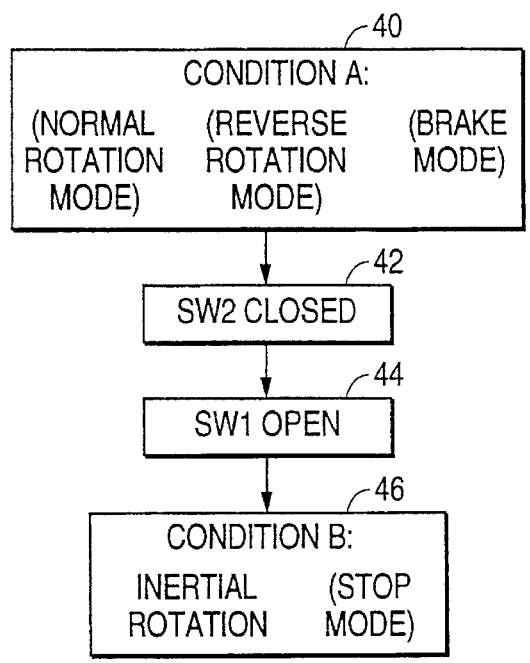
FIG. 4 is a flowchart illustrating the operation of the drive circuit in the embodiment of FIG. 1.
Figure 5:
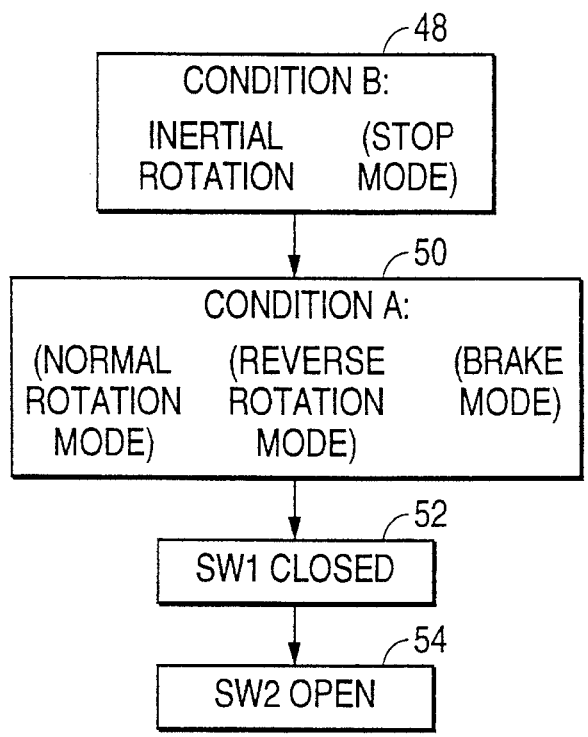
FIG. 5 is a flowchart illustrating the operation of the drive circuit in the embodiment of FIG. 1.
Figure 6:
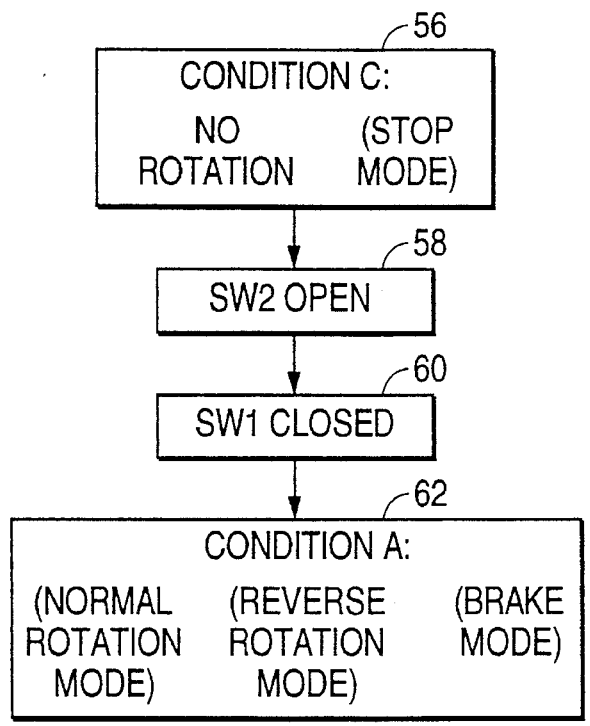
FIG. 6 is a flowchart illustrating the operation of the drive circuit in the embodiment of FIG. 1.

CCU 6 controls motor 9 according to operational sequences illustrated in FIGS. 4–6 in order to avoid a charging operation. As indicated in FIGS. 4–6, motor 9 can be in one of three conditions. Motor 9 is in Condition A when operating in normal rotation mode, reverse rotation mode, or brake mode. In Condition A, motor 9 is unable to generate back electromotive force. Motor 9 is in Condition B when in stop mode, moving by inertial rotation and thereby generating back electromotive force. Motor 9 is in Condition C when in stop mode, not rotating, without generating back electromotive force. The presence or absence of motor rotation is detected by a photointerrupter (not illustrated).

During normal operation or Condition A (that is, motor 9 is in normal rotation mode, reverse rotation mode or brake mode), second switching mechanism (SW2) 2 is open, thereby creating a condition where bypass circuit 4 is not connected, and first switching mechanism (SW1) 3 is then closed.

FIG. 4 illustrates a situation where CPU 6 switches motor 9 from Condition A in step 40 to Condition B in step 46. In step 42, a control signal is applied to switching mechanism control line 10 directly from CCU 6 or through interface circuit 7, and second switching mechanism 2 is closed, causing the energy of the back electromotive force of motor 9 to be consumed by bypass circuit 4. Then, in step 44, first switching mechanism (SW1) 3 is opened. Next, in step 46, a control signal is output from CCU 6 to motor driver circuit 8 through interface circuit 7, and motor 9 is controlled so that it is in stop mode with inertial rotation. That is, all of the switches 15–18 inside the bridge circuit of motor driver circuit 8 are opened or turned OFF.

FIG. 5 illustrates a situation when motor 9 is switched from condition B, in step 48, to Condition A, in step 50. Therefore, motor 9 is controlled so that it changes from stop mode, with inertial rotation and generating electromotive force (Condition B), to another mode (Condition A). In step 50, the control signal for changing motor 9 from stop mode to another mode is output to interface circuit 7 from CCU 6, and motor driver circuit 8 goes into a control mode other than stop mode. Then, in step 52, first switching mechanism (SW1) 3 is closed. In step 54, second switching mechanism (SW2) 2 is returned to the normal open position, or OFF.

FIG. 6 illustrates a situation where motor 9 is switched from Condition C, in step 56, to Condition A, in step 62. Therefore, motor 9 is changed from stop mode, having no rotation and not generating electromotive force, to another mode. Control is performed according to FIG. 6 when it has been confirmed via the photointerrupter that motor 9 is not generating back electromotive force. First, in step 58, second switching mechanism (SW2) 2 is open and then, in step 60, first switching mechanism (SW1) 3 is closed. In step 62, a command is issued from CCU 6 through interface circuit 7 so that motor driver circuit 8 exercises control and motor 9 enters a mode other than stop mode. In FIG. 6, since second switching mechanism (SW2) 2 is opened in step 58 and first switching mechanism (SW1) 3 is closed in step 60, the current of battery 1 does not flow to bypass circuit 4 and wasteful power consumption is prevented.

In the most simple case, bypass circuit 4 may be a resistance load. Moreover, a control signal on switching mechanism control line 10 for controlling first and second switching mechanisms 2 and 3 may be output directly from CCU 6 or it may be output by interface circuit 7 through a command of CCU 6.

As a result of the preferred embodiment of the present invention, in an inductive load drive circuit for a load, such as a motor, the current from the back electromotive force of the inductive load is reliably prevented from flowing back to the battery and, with respect to batteries for which a charging operation is not desirable, the charging operation is not performed. Moreover, the current from the back electromotive force is appropriately discharged to a specified bypass circuit so that heating up of such components as the motor can be prevented. Therefore, stable operation of instruments using battery power sources can be maintained and reliability improved. Moreover, it is only necessary to add a small amount of hardware to conventional motor drivers for the embodiment of the present invention. Therefore, large increases in the size of the circuit are prevented and it is also possible to effectively use the package area of the electrical instrument.

In order to achieve the objects of the embodiments according to the present invention, the inductive load drive circuit includes an inductive load, a battery for supplying power to the inductive load, a first switching mechanism which can serially connect the inductive load and the battery, and control devices for opening the first switching mechanism and electrically disconnecting the inductive load and the battery when the inductive load is in a condition in which it is able to generate back electromotive force or when it will be shifted to a mode in which it is able to generate back electromotive force. Furthermore, in the embodiments according to the present invention, there is a bypass circuit for consuming the energy of the back electromotive force of the inductive load and a second switching mechanism which can serially connect the bypass circuit and the inductive load. The series circuit of the bypass circuit and the second switching mechanism is connected in parallel with the series circuit of the battery and the first switching mechanism, and the first switching mechanism and the second switching mechanism are constantly controlled so that they are in opposite switching conditions.

In the inductive load drive circuit relating to the above configuration, in the case where the inductive load is in a mode in which it is able to generate back electromotive force or in the case where it will shift to a mode in which it is able to generate back electromotive force, the first switching mechanism is opened, and the inductive load and the battery are electrically disconnected. Therefore, the flow of charging current to the battery from the inductive load is prevented even if back electromotive force of the inductive load is generated. Moreover, the series circuit of the bypass circuit and the second switching mechanism is connected in parallel to the series circuit of the battery and the first switching mechanism. The first switching mechanism and the second switching mechanism are constantly controlled so that they are in opposite switching conditions, so when the first switching mechanism is open and the inductive load and battery are electrically disconnected, the bypass circuit operates so that it consumes the energy of the back electromotive force of the inductive load. Therefore, the charging of the battery by the back electromotive force of the inductive load is eliminated, and the energy from the back electromotive force of the inductive load is appropriately consumed, preventing the motor from heating up.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An inductive load drive circuit for driving an inductive load which rotates by inertia and generates back electromotive force when rotating by inertia, comprising:

a first switching mechanism, having a first state and a second state, which electrically connects the inductive load with a power source when in the first state, and disconnects the inductive load from the power source when in the second state;

a control mechanism for controlling said first switching mechanism so that said first switching mechanism is in the first state when the inductive load is unable to generate back electromotive force and said first switching mechanism is in the second state when the inductive load is rotating by inertia and generating back electromotive force or when the inductive load is to be shifted to a condition in which the inductive load is rotating by inertia and generating back electromotive force;

a bypass circuit for consuming energy of a back electromotive force generated by the inductive load to prevent the back electromotive force from charging the power source; and a second switching mechanism, having a first state and a second state, which electrically connects said bypass circuit and the inductive load when in the first state, and disconnects said bypass circuit from the inductive load when in the second state, wherein said first switching mechanism, said second switching mechanism and said bypass circuit are configured so that back electromotive force generated by the inductive load when the inductive load is rotating by inertia is connected by said bypass circuit when said first switching mechanism is in the second state and the second switching mechanism is in the first state, and so that the power source can supply power to the inductive load and said bypass circuit is not electrically connected to the inductive load when said first switching mechanism is in the first state and the second switching mechanism is in the second state, and said first switching mechanism and said second switching mechanism are controlled so that they are maintained in different states.

2. An inductive load drive circuit as in claim 1, wherein, when the inductive load is to be shifted to a condition in which the inductive load is rotating by inertia and generating back electromotive force, said second switching mechanism is switched to the first state followed by said first switching mechanism being switched to the second state and, thereafter, the inductive load is shifted to the condition in which the inductive load is rotating by inertia and generating back electromotive force.

3. An inductive load drive circuit as in claim 1, wherein, when the inductive load is to be changed from a condition in which the inductive load is rotating by inertia and generating back electromotive force to a condition in which the inductive load is unable to generate back electromotive force, the inductive load is first changed to the condition in which it is unable to generate back electromotive force and, thereafter, said first switching mechanism is switched to the first state followed by said second switching mechanism being switched to the second state.

4. An inductive load drive circuit as in claim 1, wherein, when the inductive load is to be changed from a condition in which the inductive load is able to generate, but is not generating, back electromotive force to a condition in which the inductive load is unable to generate back electromotive force, said second switching mechanism is switched to the second state followed by said first switching mechanism being switched to the first state and, thereafter, the inductive load is switched to the condition where the inductive load is unable to generate back electromotive force.

5. An inductive load drive circuit as in claim 1, wherein
said second switching mechanism and said bypass circuit are connected in series, and said second switching mechanism and said bypass circuit in series are connected in parallel with the power source.

6. An inductive load drive circuit as in claim 5, wherein, when the inductive load is to be shifted to a condition in which the inductive load is rotating bid inertia and generating back electromotive force, said second switching mechanism is switched to the first state followed by said first switching mechanism being switched to the second state and, thereafter, the inductive load is shifted to the condition in which the inductive load is rotating by inertia and generating back electromotive force.

7. An inductive load drive circuit as in claim 5, wherein, when the inductive load is to be changed from a condition in which the inductive load is rotating by inertia and generating back electromotive force to a condition in which the inductive load is unable to generate back electromotive force, the inductive load is first changed to the condition in which it is unable to generate back electromotive force and, thereafter, said first switching mechanism is switched to the first state followed by said second switching mechanism being switched to the second state.

8. An inductive load drive circuit as in claim 5, wherein, when the inductive load is to be changed from a condition in which the inductive load is able to generate, but is not generating, back electromotive force to a condition in which the inductive load is unable to generate back electromotive force, said second switching mechanism is switched to the second state followed by said first switching mechanism being switched to the first state and, thereafter, the inductive load is switched to the condition where the inductive load is unable to generate back electromotive force.

9. An inductive load drive circuit as in claim 1, wherein
said second switching mechanism and said bypass circuit are connected in series, the power source and said first switching mechanism are connected in series, and the series connected second switching mechanism and bypass circuit are connected in parallel with the series connected power source and first switching mechanism.

10. An inductive load drive circuit as in claim 9, wherein, when the inductive load is to be shifted to a condition in which the inductive load is rotating by inertia and generating back electromotive force, said second switching mechanism is switched to the first state followed by said first switching mechanism being switched to the second state and, thereafter, the inductive load is shifted to the condition in which the inductive load is rotating by inertia and generating back electromotive force.

11. An inductive load drive circuit as in claim 9, wherein, when the inductive load is to be changed from a condition in which the inductive load is rotating and generating back electromotive force to a condition in which the inductive load is unable to generate back electromotive force, the inductive load is first changed to the condition in which it is unable to generate back electromotive force and, thereafter, said first switching mechanism is switched to the first state followed by said second switching mechanism being switched to the second state.

12. An inductive load drive circuit as in claim 9, wherein, when the inductive load is to be changed from a condition in which the inductive load is able to generate, but is not generating, back electromotive force to a condition in which the inductive load is unable to generate back electromotive force, said second switching mechanism is switched to the second state followed by said first switching mechanism being switched to the first state and, thereafter, the inductive load is switched to the condition where the inductive load is unable to generate back electromotive force.

13. An inductive load drive circuit for driving an inductive load, comprising:
a first switching mechanism, having a first state and a second state, which electrically connects the inductive load with a power source when in the first state, and disconnects the inductive load from the power source when in the second state;

a control mechanism for controlling said first switching mechanism so that said first switching mechanism is in the first state when the inductive load is unable to generate back electromotive force and said first switching mechanism is in the second state when the inductive load is able to generate back electromotive force or when the inductive load is to be shifted to a condition in which the inductive load is able to generate back electromotive force;

a bypass circuit for consuming energy of a back electromotive force generated by the inductive load; and a second switching mechanism, having a first state and a second state, which electrically connects said bypass circuit and the inductive load when in the first state, and disconnects said bypass circuit from the inductive load when in the second state, wherein said first switching mechanism, said second switching mechanism and said bypass circuit are configured so that back electromotive force generated by the inductive load is consumed by said bypass circuit when said first switching mechanism is in the second state and the second switching mechanism is in the first state, and so that the power source can supply power to the inductive load and said bypass circuit is not electrically connected to the inductive load when said first switching mechanism is in the first state and the second switching mechanism is in the second state, said first switching mechanism and said second switching mechanism are controlled so that they are maintained in different states and when the inductive load is to be shifted to a condition in which the inductive load generates back electromotive force, said second switching mechanism is switched to the first state followed by said first switching mechanism being switched to the second state and, thereafter, the inductive load is shifted to the condition in which it can generate back electromotive force.

14. An inductive load drive circuit for driving an inductive load, comprising:
a first switching mechanism, having a first state and a second state, which electrically connects the inductive load with a power source when in the first state, and disconnects the inductive load from the power source when in the second state;

a control mechanism for controlling said first switching mechanism so that said first switching mechanism is in the first state when the inductive load is unable to generate back electromotive force and said first switching mechanism is in the second state when the inductive load is able to generate back electromotive force or when the inductive load is to be shifted to a condition in which the inductive load is able to generate back electromotive force;

a bypass circuit for consuming energy of a back electromotive force generated by the inductive load; and a second switching mechanism, having a first state and a second state, which electrically connects said bypass circuit and the inductive load when in the first state, and disconnects said bypass circuit from the inductive load when in the second state, wherein said first switching mechanism, said second switching mechanism and said bypass circuit are configured so that back electromotive force generated by the inductive load is consumed by said bypass circuit when said first switching mechanism is in the second state and the second switching mechanism is in the first state, and so that the power source can supply power to the inductive load and said bypass circuit is not electrically connected to the inductive load when said first switching mechanism is in the first state and the second switching mechanism is in the second state, said first switching mechanism and said second switching mechanism are controlled so that they are maintained in different states, and when the inductive load is to be changed from a condition in which the inductive load can generate, and is generating, back electromotive force to a condition in which the inductive load is unable to generate back electromotive force, the inductive load is first changed to the condition in which it is unable to generate back electromotive force and, thereafter, said first switching mechanism is switched to the first state followed by said second switching mechanism being switched to the second state.

15. An inductive load drive circuit for driving an inductive load, comprising:

a first switching mechanism, having a first state and a second state, which electrically connects the inductive load with a power source when in the first state, and disconnects the inductive load from the power source when in the second state;

a control mechanism for controlling said first switching mechanism so that said first switching mechanism is in the first state when the inductive load is unable to generate back electromotive force and said first switching mechanism is in the second state when the inductive load is able to generate back electromotive force or when the inductive load is to be shifted to a condition in which the inductive load is able to generate back electromotive force;

a bypass circuit for consuming energy of a back electromotive force generated by the inductive load; and a second switching mechanism, having a first state and a second state, which electrically connects said bypass circuit and the inductive load when in the first state, and disconnects said bypass circuit from the inductive load when in the second state, wherein said first switching mechanism, said second switching mechanism and said bypass circuit are configured so that back electromotive force generated by the inductive load is consumed by said bypass circuit when said first switching mechanism is in the second state and the second switching mechanism is in the first state, and so that the power source can supply power to the inductive load and said bypass circuit is not electrically connected to the inductive load when said first switching mechanism is in the first state and the second switching mechanism is in the second state, said first switching mechanism and said second switching mechanism are controlled so that they are maintained in different states, and when the inductive load is to be changed from a condition in which the inductive load is able to generate, but is not generating, back electromotive force to a condition in which it is unable to generate back electromotive force, said second switching mechanism is switched to the second state followed by said first switching mechanism being switched to the first state and, thereafter, the inductive load is switched to the condition where the inductive load is unable to generate back electromotive force.

16. An inductive load drive circuit for driving an inductive load, comprising:

a first switching mechanism, having a first state and a second state, which electrically connects the inductive load with a power source when in the first state, and disconnects the inductive load from the power source when in the second state;

a control mechanism for controlling said first switching mechanism so that said first switching mechanism is in the first state when the inductive load is unable to generate back electromotive force and said first switching mechanism is in the second state when the inductive load is able to generate back electromotive force or when the inductive load is to be shifted to a condition in which the inductive load is able to generate back electromotive force;

a bypass circuit for consuming energy of a back electromotive force generated by the inductive load; and a second switching mechanism, having a first state and a second state, which electrically connects said bypass circuit and the inductive load when in the first state, and disconnects said bypass circuit from the inductive load when in the second state, wherein said first switching mechanism, said second switching mechanism and said bypass circuit are configured so that back electromotive force generated by the inductive load is consumed by said bypass circuit when said first switching mechanism is in the second state and the second switching mechanism is in the first state, and so that the power source can supply power to the inductive load and said bypass circuit is not electrically connected to the inductive load when said first switching mechanism is in the first state and the second switching mechanism is in the second state, said first switching mechanism and said second switching mechanism are controlled so that they are maintained in different states, said second switching mechanism and said bypass circuit are connected in series, and said second switching mechanism and said bypass circuit in series are connected in parallel with the power source, and when the inductive load is to be shifted to a condition in which the inductive load generates back electromotive force, said second switching mechanism is switched to the first state followed by said first switching mechanism being switched to the second state and, thereafter, the inductive load is shifted to the condition in which it can generate back electromotive force.

17. An inductive load drive circuit for driving an inductive load, comprising:

a first switching mechanism, having a first state and a second state, which electrically connects the inductive load with a power source when in the first state, and disconnects the inductive load from the power source when in the second state;

a control mechanism for controlling said first switching mechanism so that said first switching mechanism is in the first state when the inductive load is unable to generate back electromotive force and said first switching mechanism is in the second state when the inductive load is able to generate back electromotive force or when the inductive load is to be shifted to a condition in which the inductive load is able to generate back electromotive force;

a bypass circuit for consuming energy of a back electromotive force generated by the inductive load; and a second switching mechanism, having a first state and a second state, which electrically connects said bypass circuit and the inductive load when in the first state, and disconnects said bypass circuit from the inductive load when in the second state, wherein said first switching mechanism, said second switching mechanism and said bypass circuit are configured so that back electromotive force generated by the inductive load is consumed by said bypass circuit when said first switching mechanism is in the second state and the second switching mechanism is in the first state, and so that the power source can supply power to the inductive load and said bypass circuit is not electrically connected to the inductive load when said first switching mechanism is in the first state and the second switching mechanism is in the second state, said first switching mechanism and said second switching mechanism are controlled so that they are maintained in different states, said second switching mechanism and said bypass circuit are connected in series, and said second switching mechanism and said bypass circuit in series are connected in parallel with the power source, and when the inductive load is to be changed from a condition in which the inductive load can generate, and is generating, back electromotive force to a condition in which the inductive load is unable to generate back electromotive force, the inductive load is first changed to the condition in which it is unable to generate back electromotive force and, thereafter, said first switching mechanism is switched to the first state followed by said second switching mechanism being switched to the second state.

18. An inductive load drive circuit for driving an inductive load, comprising:

a first switching mechanism, having a first state and a second state, which electrically connects the inductive load with a power source when in the first state, and disconnects the inductive load from the power source when in the second state;

a control mechanism for controlling said first switching mechanism so that said first switching mechanism is in the first state when the inductive load is unable to generate back electromotive force and said first switching mechanism is in the second state when the inductive load is able to generate back electromotive force or when the inductive load is to be shifted to a condition in which the inductive load is able to generate back electromotive force;

a bypass circuit for consuming energy of a back electromotive force generated by the inductive load; and a second switching mechanism, having a first state and a second state, which electrically connects said bypass circuit and the inductive load when in the first state, and disconnects said bypass circuit from the inductive load when in the second state, wherein said first switching mechanism, said second switching mechanism and said bypass circuit are configured so that back electromotive force generated by the inductive load is consumed by said bypass circuit when said first switching mechanism is in the second state and the second switching mechanism is in the first state, and so that the power source can supply power to the inductive load and said bypass circuit is not electrically connected to the inductive load when said first switching mechanism is in the first state and the second switching mechanism is in the second state, said first switching mechanism and said second switching mechanism are controlled so that they are maintained in different states, said second switching mechanism and said bypass circuit are connected in series, and said second switching mechanism and said bypass circuit in series are connected in parallel with the power source, and when the inductive load is to be changed from a condition in which the inductive load is able to generate, but is not generating, back electromotive force to a condition in which it is unable to generate back electromotive force, said second switching mechanism is switched to the second state followed by said first switching mechanism being switched to the first state and, thereafter, the inductive load is switched to the condition where the inductive load is unable to generate back electromotive force.

19. An inductive load drive circuit for driving an inductive load, comprising:

a first switching mechanism, having a first state and a second state, which electrically connects the inductive load with a power source when in the first state, and disconnects the inductive load from the power source when in the second state;

a control mechanism for controlling said first switching mechanism so that said first switching mechanism is in the first state when the inductive load is unable to generate back electromotive force and said first switching mechanism is in the second state when the inductive load is able to generate back electromotive force or when the inductive load is to be shifted to a condition in which the inductive load is able to generate back electromotive force;

a bypass circuit for consuming energy of a back electromotive force generated by the inductive load; and a second switching mechanism, having a first state and a second state, which electrically connects said bypass circuit and the inductive load when in the first state, and disconnects said bypass circuit from the inductive load when in the second state, wherein said first switching mechanism, said second switching mechanism and said bypass circuit are configured so that back electromotive force generated by the inductive load is consumed by said bypass circuit when said first switching mechanism is in the second state and the second switching mechanism is in the first state, and so that the power source can supply power to the inductive load and said bypass circuit is not electrically connected to the inductive load when said first switching mechanism is in the first state and the second switching mechanism is in the second state, said first switching mechanism and said second switching mechanism are controlled so that they are maintained in different states, said second switching mechanism and said bypass circuit are connected in series, the power source and said first switching mechanism are connected in series, and the series connected second switching mechanism and bypass circuit are connected in parallel with the series connected power source and first switching mechanism, and when the inductive load is to be shifted to a condition in which the inductive load generates back electromotive force, said second switching mechanism is switched to the first state followed by said first switching mechanism being switched to the second state and, thereafter, the inductive load is shifted to the condition in which it can generate back electromotive force.

20. An inductive load drive circuit for driving an inductive load, comprising:

a first switching mechanism, having a first state and a second state, which electrically connects the inductive load with a power source when in the first state, and disconnects the inductive load from the power source when in the second state;

a control mechanism for controlling said first switching mechanism so that said first switching mechanism is in the first state when the inductive load is unable to generate back electromotive force and said first switching mechanism is in the second state when the inductive load is able to generate back electromotive force or when the inductive load is to be shifted to a condition in which the inductive load is able to generate back electromotive force;

a bypass circuit for consuming energy of a back electromotive force generated by the inductive load; and a second switching mechanism, having a first state and a second state, which electrically connects said bypass circuit and the inductive load when in the first state, and disconnects said bypass circuit from the inductive load when in the second state, wherein said first switching mechanism, said second switching mechanism and said bypass circuit are configured so that back electromotive force generated by the inductive load is consumed by said bypass circuit when said first switching mechanism is in the second state and the second switching mechanism is in the first state, and so that the power source can supply power to the inductive load and said bypass circuit is not electrically connected to the inductive load when said first switching mechanism is in the first state and the second switching mechanism is in the second state, said first switching mechanism and said second switching mechanism are controlled so that they are maintained in different states, said second switching mechanism and said bypass circuit are connected in series, the power source and said first switching mechanism are connected in series, and the series connected second switching mechanism and bypass circuit are connected in parallel with the series connected power source and first switching mechanism, and when the inductive load is to be changed from a condition in which the inductive load can generate, and is generating, back electromotive force to a condition in which the inductive load is unable to generate back electromotive force, the inductive load is first changed to the condition in which it is unable to generate back electromotive force and, thereafter, said first switching mechanism is switched to the first state followed by said second switching mechanism being switched to the second state.

21. An inductive load drive circuit for driving an inductive load, comprising:

a first switching mechanism, having a first state and a second state, which electrically connects the inductive load with a power source when in the first state, and disconnects the inductive load from the power source when in the second state;

a control mechanism for controlling said first switching mechanism so that said first switching mechanism is in the first state when the inductive load is unable to generate back electromotive force and said first switching mechanism is in the second state when the inductive load is able to generate back electromotive force or when the inductive load is to be shifted to a condition in which the inductive load is able to generate back electromotive force;

a bypass circuit for consuming energy of a back electromotive force generated by the inductive load; and a second switching mechanism, having a first state and a second state, which electrically connects said bypass circuit and the inductive load when in the first state, and disconnects said bypass circuit from the inductive load when in the second state, wherein said first switching mechanism, said second switching mechanism and said bypass circuit are configured so that back electromotive force generated by the inductive load is consumed by said bypass circuit when said first switching mechanism is in the second state and the second switching mechanism is in the first state, and so that the power source can supply power to the inductive load and said bypass circuit is not electrically connected to the inductive load when said first switching mechanism is in the first state and the second switching mechanism is in the second state, said first switching mechanism and said second switching mechanism are controlled so that they are maintained in different states, said second switching mechanism and said bypass circuit are connected in series, the power source and said first switching mechanism are connected in series, and the series connected second switching mechanism and bypass circuit are connected in parallel with the series connected power source and first switching mechanism, and when the inductive load is to be changed from a condition in which the inductive load is able to generate, but is not generating, back electromotive force to a condition in which it is unable to generate back electromotive force, said second switching mechanism is switched to the second state followed by said first switching mechanism being switched to the first state and, thereafter, the inductive load is switched to the condition where the inductive load is unable to generate back electromotive force.

* * * * *

UNITED STATES PATENT AND TRADEMARK OFFICE
CERTIFICATE OF CORRECTION

PATENT NO. :  5,528,115
DATED      :  June 18, 1996
INVENTOR(S):  Fumiya TAGUCHI It is certified that error appears in the above-indentified patent and that said Letters Patent is hereby corrected as shown below:

Column 6, line 27, delete "connected" and insert therefor --consumed--.

Signed and Sealed this

Twenty-ninth Day of October 1996

Attest:

BRUCE LEHMAN

Attesting Officer     Commissioner of Patents and Trademarks